(12) United States Patent
Haehnel et al.

(10) Patent No.: US 9,346,631 B2
(45) Date of Patent: May 24, 2016

(54) DEVICE FOR TRANSFERRING BLISTER PACKS

(71) Applicant: Uhlmann Pac-Systeme GmbH & Co. KG, Laupheim (DE)

(72) Inventors: Bernd Haehnel, Stutensee (DE); Roberto Linke, Neu-Ulm (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 118 days.

(21) Appl. No.: 14/465,201

(22) Filed: Aug. 21, 2014

(65) Prior Publication Data

US 2015/0056046 A1 Feb. 26, 2015

(30) Foreign Application Priority Data

Aug. 23, 2013 (EP) .................................... 13181518
Jul. 2, 2014 (EP) .................................... 14175387

(51) Int. Cl.
*B65G 47/91* (2006.01)
*B65B 35/54* (2006.01)
*B65B 35/38* (2006.01)
*B65B 35/50* (2006.01)
*B65G 47/04* (2006.01)

(52) U.S. Cl.
CPC .............. *B65G 47/918* (2013.01); *B65B 35/38* (2013.01); *B65B 35/50* (2013.01); *B65B 35/54* (2013.01); *B65G 47/04* (2013.01); *B65G 47/914* (2013.01); *B65G 47/915* (2013.01)

(58) Field of Classification Search
CPC ....... B65B 35/50; B65B 35/54; B65G 47/915
See application file for complete search history.

(56) References Cited

U.S. PATENT DOCUMENTS

| 3,580,442 A | * | 5/1971 | Rohdin | ................... | B65B 43/46 414/736 |
| 3,587,888 A | * | 6/1971 | Warren | ................ | B65G 47/915 414/728 |
| 4,343,391 A | * | 8/1982 | Skrypek | ............... | B65G 57/165 414/737 |

(Continued)

FOREIGN PATENT DOCUMENTS

| DE | 102004043332 A1 | 3/2006 |
| EP | 1595828 A2 | 11/2005 |

(Continued)

OTHER PUBLICATIONS

I European Search Report for priority application EP 13181518.5 dated Dec. 12, 2013.

*Primary Examiner* — Gerald McClain
(74) *Attorney, Agent, or Firm* — Brinks Gilson & Lione

(57) ABSTRACT

Two suction arms for picking up blister packs at a stamping station in a pick position and for placing the blister packs on a conveyor in a place position, wherein the suction arms are pivotable in opposite directions. Each suction arm has three segments supported pivotably around three different axes. The transfer movement of the blister packs from the pick position to the place position and back is a combination movement, which is composed at least of the pivoting movement of the three segments around the three axes. The second, middle segments are pivoted inward toward the center plane both when in the pick position and in the place position. During the pivoting movements between the pick position and the place position, the second segments are pivoted away from each other so that the suction arms can pass by each other without colliding.

15 Claims, 14 Drawing Sheets

(56) References Cited

U.S. PATENT DOCUMENTS

| | | | |
|---|---|---|---|
| 7,690,498 B2* | 4/2010 | Hahnel et al. | B65G 47/918 414/729 |
| 2004/0013508 A1* | 1/2004 | Ziegler | B65G 47/915 414/732 |

FOREIGN PATENT DOCUMENTS

| | | |
|---|---|---|
| WO | WO 00/68086 A1 | 11/2000 |
| WO | WO 2005097601 A1 | 10/2005 |

* cited by examiner

DEVICE FOR TRANSFERRING BLISTER PACKS

RELATED APPLICATIONS

The present patent document claims the benefit of priority to European Patent Application No. EP 13181518.5, filed Aug. 23, 2013 and EP 14175387.1, filed Jul. 2, 2014, the entire contents of each of which are incorporated herein by reference.

FIELD AND BACKGROUND OF THE INVENTION

The present invention pertains to a device for transferring blister packs from a stamping station to a conveying means.

Blister packs are often used in the pharmaceutical industry for the packaging of medications. First a plurality of pockets is formed in a web of plastic sheet material, and then products such as sugar-coated pills or tablets are introduced into the pockets. Finally, the web of plastic sheet material with the filled pockets is sealed by a cover sheet and sent to a stamping station, where the individual blister packs are stamped out of the web of plastic sheet material.

In a subsequent phase of the packaging process, the stamped-out blister packs are transferred to a conveying means by means of a transfer device. The blister packs are set down in stacks in individual compartments of the conveying means. Then the stacks arranged on the conveying means are sent to a packaging station, where the stacks of blister packs are introduced into appropriate packages such as folding boxes. The time which the transfer device requires to move the blister packs from the stamping station to the conveying means logically has an effect on the throughput of the packaging machine as a whole.

In a known transfer device according to U.S. Pat. No. 7,690,498 B2, the web of sheet material with the filled and sealed pockets is sent vertically to a stamping station. The blister packs, which are stamped out while still in a vertical position, are then picked up by a suction arm of the transfer device, transferred to the opposite side of the transfer device, and placed on a conveying means located further below, but this time with the blister packs in a horizontal position.

SUMMARY OF THE INVENTION

It is an object of the present invention to provide an improved device for transferring blister packs from a stamping station to a conveying means, in which the blister packs are transferred more efficiently and with greater precision.

According to an aspect of the invention, the device for transferring blister packs from a stamping station to a conveying means comprises a first and a second suction arm for picking up the blister packs from the stamping station in a pick position, for moving the blister packs in a conveying direction, and for placing the blister packs onto the conveying means in a place position. The first suction arm is arranged on one side of a center plane, the second suction arm on the other side of the center plane, and the first and second suction arms are pivotable around a first axis, which is perpendicular to the conveying direction and also perpendicular to the center plane. The pivoting movements of the first and second suction arms are controlled in such a way that the two suction arms execute back-and-forth movements in opposite directions. Each suction arm comprises a first segment, a second or middle segment, and a third segment. The first segment of each suction arm is mounted pivotably around the associated first axis and comprises a section a certain distance away from the first axis, to which the second segment is attached pivotably around a non-stationary second axis, which is substantially perpendicular to the first axis. The second segment, for its own part, comprises a section a certain distance away from the second axis, to which a third segment is attached rotatably around a non-stationary third axis, which is substantially parallel to, and a certain distance away, from the second axis. The third segment comprises a section on which at least one suction element for picking up and holding a blister pack is arranged. The transfer movement of the blister packs from the pick position to the place position and back is a combination movement, which is composed of the pivoting movement around the first axis, the pivoting movement around the second axis, and the rotational movement around the third axis. The blister packs are thus picked up from above by the at least one suction element in the pick position and also placed from above onto the conveying means in the place position. The second segments are pivoted inward toward the center plane when in both the pick position and the place position, whereas they pivot away from each other during the opposite pivoting movement of the suction arms between the pick position and the place position, as a result of which the suction arms are able to pass by each other without colliding.

Because the blister packs are in a horizontal position when they are picked up by the suction elements of the transfer device at the stamping station, it is possible to feed the web of plastic sheet horizontally to the stamping station and to move the stamping tool vertically downward from above to execute the stamping operation. Because now both the filling of the pockets, which must in any case be done while the plastic sheet is in a horizontal position, and the stamping operation are carried out with the plastic sheet in a horizontal position, a more compact and thus more efficient packaging process can be realized.

The segments of the suction arms are preferably mechanically linked to each other in such a way that the pivoting movement of the first segment causes a pivoting movement of the second segment and the pivoting movement of the second segment causes a rotational movement of the third segment. Ultimately, therefore, it is necessary only to realize the pivoting movement of the first segment by means of a drive or a cam, whereas the other movements of the second and third segments, accompany the driven movement of the first segment as a result of the mechanical linkage of the various segments to each other. There is no need for separate, active drives for the second and third segments.

In a further elaboration, the third segment of the first suction arm and the third segment of the second suction arm can be brought into the same pick position to pick up the blister packs. The advantage here is that space is saved in the area of the stamping station to the extent that the third segments "share" a pick position. In other words, with respect to the 3-dimensional engineering involved, it is necessary to take into consideration only a single pick position instead of two different pick positions into which the third segments would have to be brought, and this results in turn in a simpler and more compact transfer device.

When the suction arms are moved from the pick position to the place position or vice versa, the second segments execute pivoting movements of 360° around the second axis. This makes it easy to bring the suction arms into the pick and place positions and also to have them execute the required collision-avoiding movements.

In a further special embodiment, a bevel gear is supported rotatably in the first segment, this gear being connected non-rotatably to the second segment, wherein, when the first segment rotates around the first axis, the bevel gear rolls over another, stationary bevel gear and causes the second segment to pivot around the second axis.

In another, even more special embodiment, a first belt pulley is mounted in the second segment and connected nonrotatably to the first segment, and a second belt pulley is mounted in the second segment and supported rotatably. The first belt pulley and the second belt pulley are mechanically linked by a toothed belt, wherein a pivoting movement of the second segment brings about a rotational movement of the second belt pulley. The second belt pulley is connected nonrotatably to the third segment, wherein a rotational movement of the second belt pulley brings about a rotational movement of the third segment around the third axis.

In a first embodiment, the pick position and the place position are on different horizontal planes, so that the transfer involves both horizontal and vertical transfer movements.

Each of the two suction arms is preferably supported rotatably on its own slide, which can travel vertically on an associated guide device, and drive units are provided to move the slides in the vertical direction. Positive guidance is provided between the suction arm and the drive unit, such that the vertical movements of the slides bring about simultaneous pivoting movements of the suction arms in opposite rotational directions around the first axis, wherein the first axis is nonstationary because of the displacement of the slides.

Each drive unit also comprises a rotary drive; and assigned to each slide is a toothed belt drive operating in the vertical direction. Each of these belt drives consists of a toothed belt, a drive belt pulley, and a trailing belt pulley. The slides are connected to their assigned belts, and the rotary drives actuate the associated drive belt pulleys to move the slides in the vertical direction.

Finally, a larger gear wheel is rotatably supported on each slide, to each of which in turn a lever is attached, wherein a cam roller is arranged on the lever, the cam roller being guided along a cam guideway in such a way that the movement of the cam roller along the guideway results in a deflecting movement of the lever and thus a rotational movement of the larger gear wheel. Also rotatably mounted on each slide is a smaller gear wheel, which meshes with the larger gear wheel and is nonrotatably connected to the associated suction arm in order to pivot the suction arm around the first axis.

Alternatively, the pick position and the place position can lie substantially in the same horizontal plane.

In that case, it is then advantageous to assign a first and a second drive directly to the first and to the second suction arm in order to pivot the suction arms in opposite rotational directions.

BRIEF DESCRIPTION OF THE DRAWINGS

Additional features and advantages of the present invention can be derived from the following description, which refers to the drawings.

DETAILED DESCRIPTION OF SPECIFIC EMBODIMENTS

Figure 1:
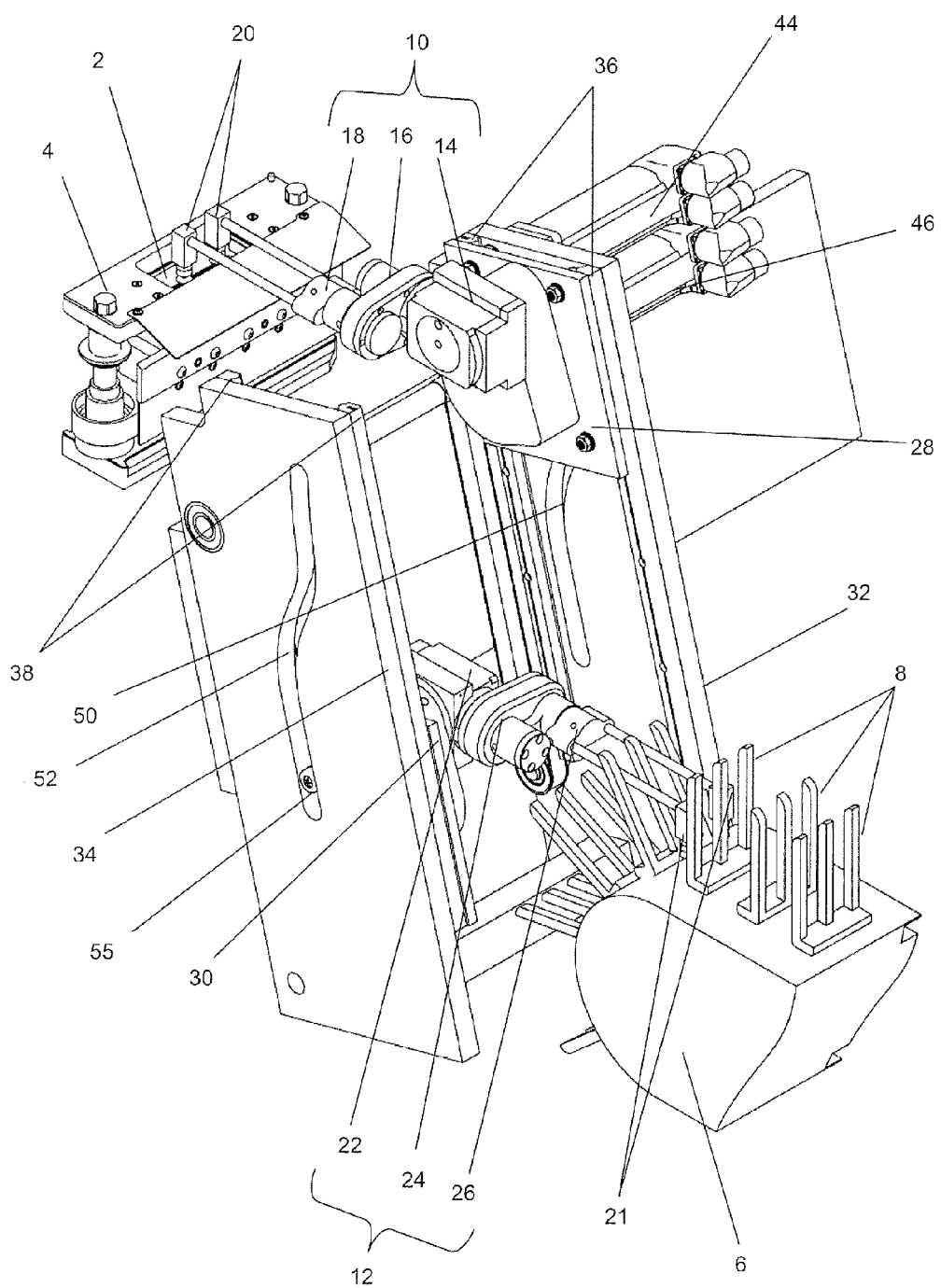
FIGS. 1-6 show perspective views of a first embodiment of a device for transferring blister packs according to the invention, in which the various phases of the transfer movement of the first suction arm and of the simultaneous return movement of the second suction arm are shown.

FIG. 1 shows a first embodiment of the device for transferring blister packs 2 from a stamping station 4 to a conveying means 6, which, in FIGS. 1-6 and in FIGS. 8-12, is designed as a transport chain for items to be packaged. A supply shaft containing blister packs 2 stacked on top of each other can be present in the area of the stamping station 4, but it is also possible for the blister packs 2 to be provided individually to the stamping station 4. In the present example, the conveying means 6 comprises fork-like, multi-fingered separators 8, which form compartments capable of holding several blister packs 2.

The device for transferring the blister packs 2 is located between the stamping station 4 and the conveying means 6 and comprises a first suction arm 10 and a second suction arm 12, one of which is on one side of the center plane of the device, the other one on the other side. The first suction arm 10 comprises a first segment 14, a second segment 16, and a third segment 18. The third segment 18 comprises two suction elements 20 at its outer end. The second suction arm 12 also comprises a first segment 22, a second segment 24, and a third segment 26. The third segment 26 also comprises two suction elements 21 at its outer end. The three segments 14, 16, 18 of the suction arm 10 are connected pivotably to each other, and the three segments 22, 24, 26 of the suction arm 12 are also connected pivotably to each other. Details on the various pivoting connections are given further below.

The two suction arms 10 and 12 are pivotably mounted on individual slides 28, 30. Each of the slides 28, 30 is supported in turn on a guide device in vertically movable fashion. In the example shown here, the guide device comprises two frame plate elements 32, 34, which are a certain distance apart and which are preferably connected to each other. A pair of guide rails 36, 38 for the slides 28, 30 is provided on each of the frame plate elements 32, 34. The drive for the vertical movement of the slides 28, 30, on which the suction arms 10 and 12 are arranged, is implemented in the form of, for example, a toothed belt drive extending in the vertical direction, one for each suction arm. Each toothed belt drive preferably comprises a toothed belt 40 and two pulleys, namely, an upper drive pulley 41 and a lower trailing pulley 42 (see FIG. 3).

The pulleys 41, 42 are each rotatably mounted on the inside surfaces of the parallel frame plate elements 32, 34 and are rotated by a first and a second rotary drive 44, 46. In FIG. 1, the two rotary drives 44, 46 are mounted on the right side, i.e., on the right frame plate element 32. The first belt drive, that is, the belt drive on the right in FIG. 1 assigned to the suction arm 10, is driven directly by the first rotary drive 44, whereas the second belt drive, i.e., the belt drive on the left in FIG. 1 assigned to the suction arm 12, is driven by the second rotary drive 46 by way of a separately provided drive shaft 48 (FIG. 3), which extends transversely to the parallel frame plate elements 32, 34 and passes through them. The belt drives assigned to the suction arms 10 and 12 are therefore rotated independently of each other by separate rotary drives. The rotary drives 44, 46 are preferably servomotors.

Each of the two slides 28, 30 is connected to its own toothed belt 40 in such a way that, when the associated drive pulleys 41 are driven in a first rotational direction, the slide 28, 30 in question and thus the suction arm 10, 12 mounted on it is moved upward, and also in such a way that, when the drive pulley 41 is driven in a second rotational direction opposite the first direction, the associated slide 28, 30 with the suction arm 10, 12 mounted on it is moved downward. The back-and-forth movement of the slides 28, 30 takes place simultaneously, that is, while the first slide 28 is being moved downward, the second slide 30 is being moved upward and vice versa.

In addition to the configuration just described, many other types of drives for producing the vertical movement of the slides 28, 30 will occur to the person skilled in the art.

As can also be seen in FIG. 1, cam guideways 50, 52 are provided in the frame plate elements 32, 34. The cam guideways 50, 52 are configured in the form of vertically oriented slots with slanted sections. A cam roller 55 is guided in each of these slots (only the cam roller 55 can be seen in FIG. 1). Each slot comprises three sections, namely, an upper section, at a slight angle to the vertical; a lower, vertical section; and a connecting section between the other two, which is inclined more to the horizontal than the upper and lower sections and which in particular is in the form of an arc. Thus the movement of the cam rollers 55 guided along the cam guideways 50, 52 also includes a horizontal component.

Figure 5:
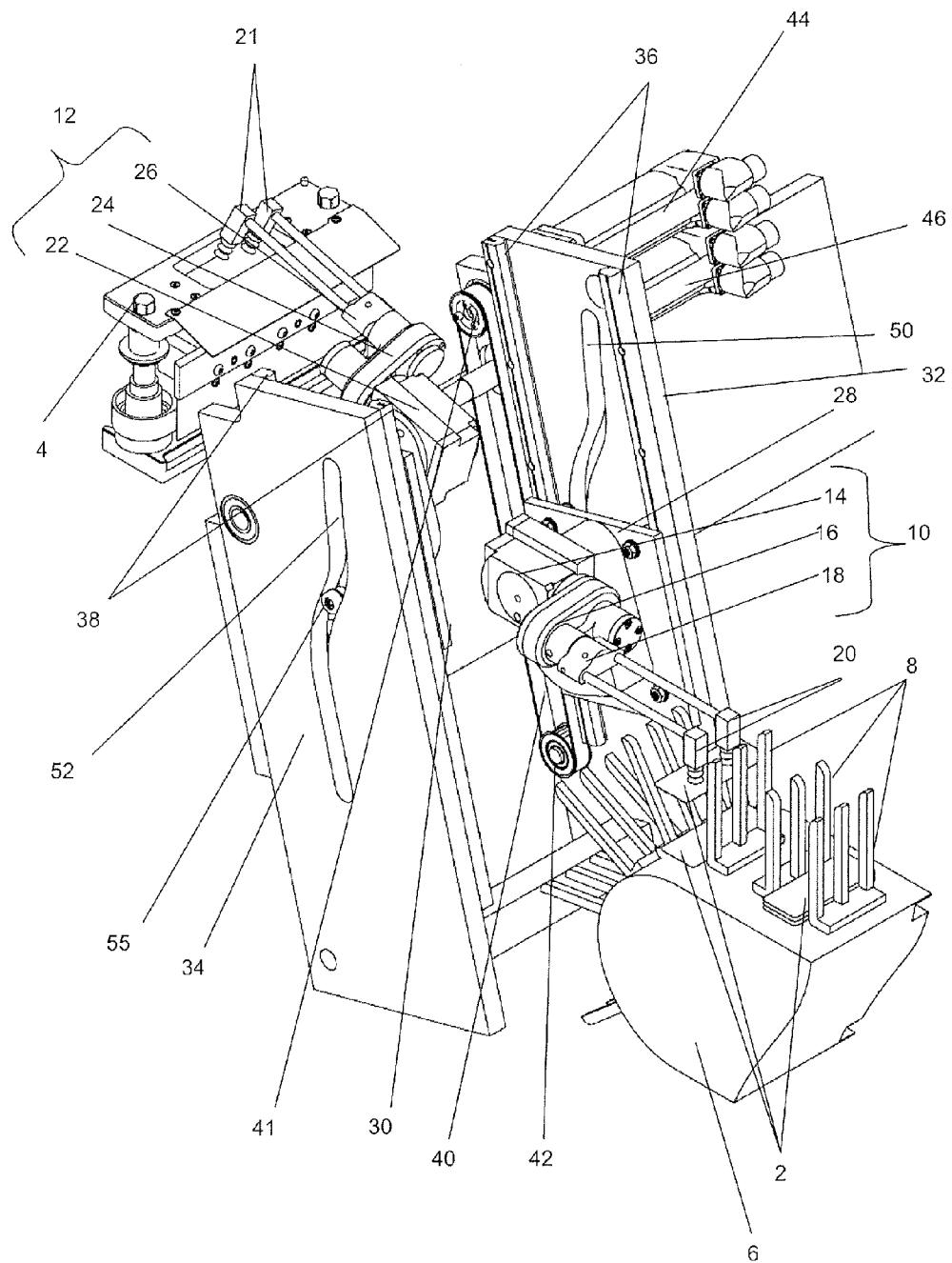
Figure 6:
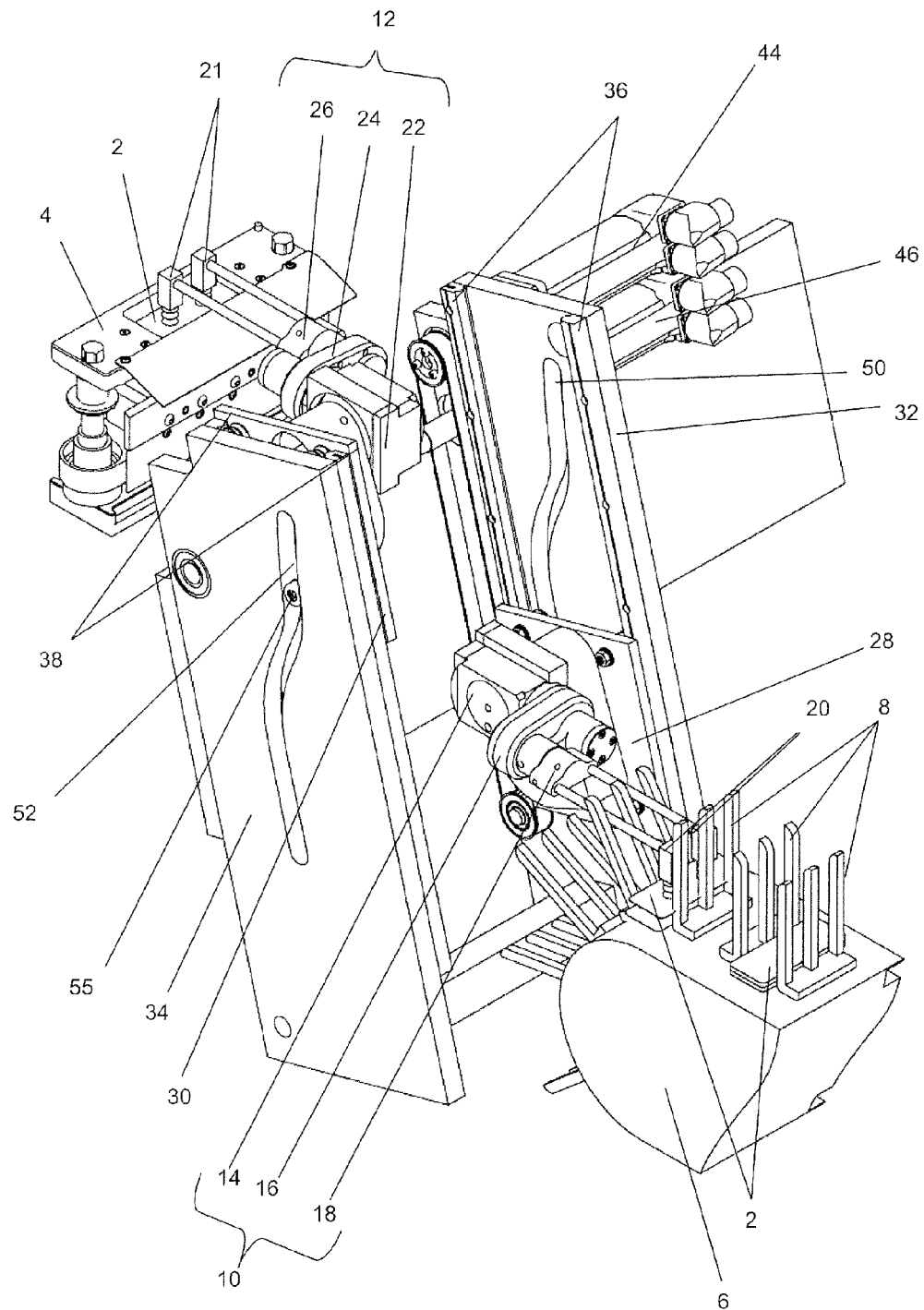
Figure 7:
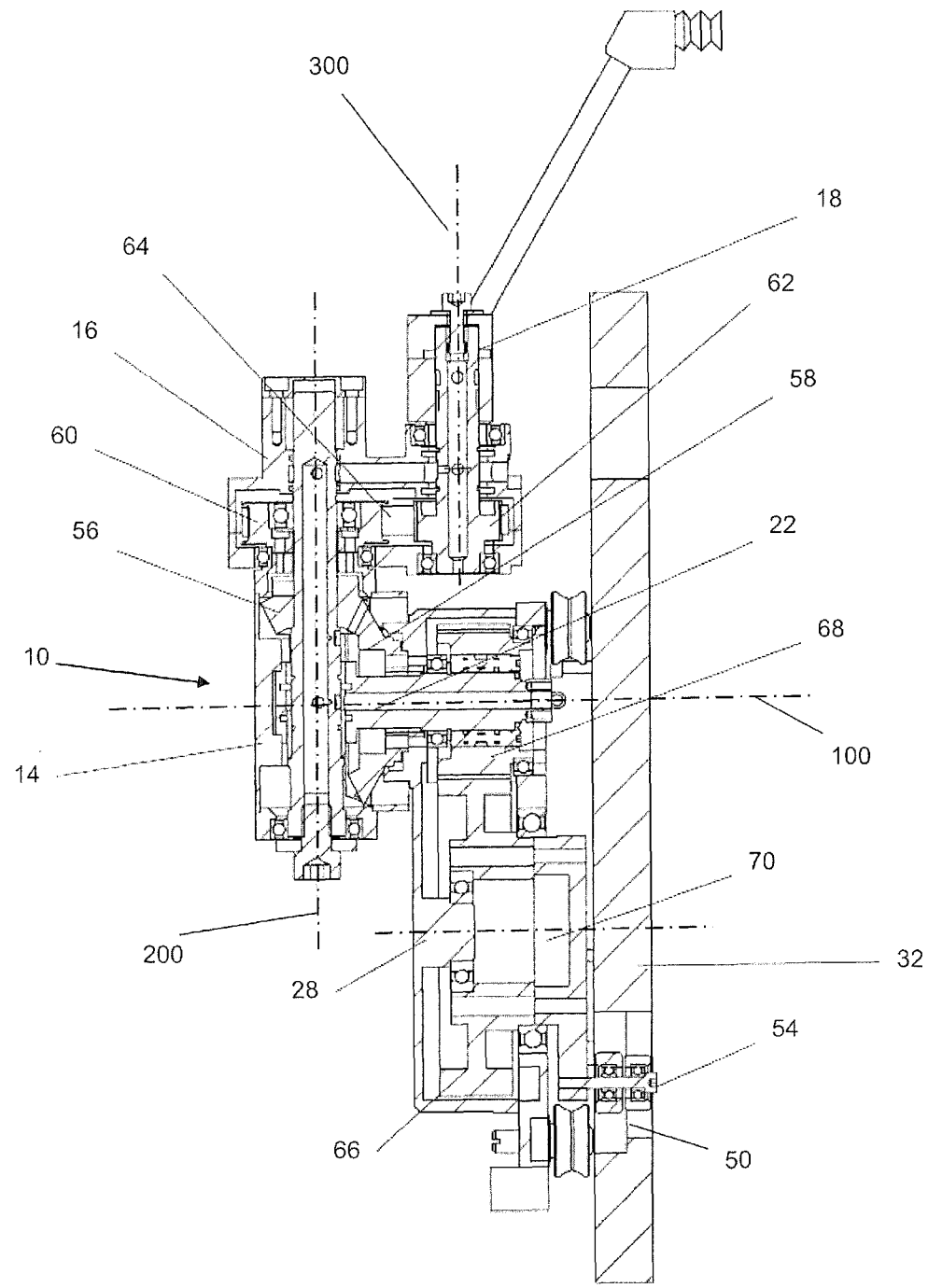
FIG. 7 shows a cross-sectional view of the first suction arm of FIGS. 1-6.

FIG. 7 shows the internal structure of the first suction arm 10 of FIGS. 1-6. The first segment 14 of the suction arm 10 is mounted on the slide 28 pivotably around the first rotational axis 100. The second segment 16, which is free to pivot around a second axis 200 substantially perpendicular to the first axis 100, is mounted pivotably on a section of the first segment 14 a certain distance away from the first axis 100. When the first segment 14 pivots around the first axis 100, the second axis 200 is carried along concurrently, i.e. the second axis 200 is non-stationary. The second segment 16, in turn, comprises a section a certain distance away from the second axis 200, namely, a section on which the third segment 18 is rotatably mounted so that it can rotate around a third axis 300, which is substantially parallel to, and a certain distance away from, the second axis 200. When the first and second segments 14 and 16 pivot, the third axis 300 is carried along concurrently, i.e. the third axis 300 is also non-stationary.

In concrete terms, a second bevel gear 56 is rotatably supported in the first segment 14. This second bevel gear 56 is permanently connected to the second axis 200 and is thus connected nonrotatably to the second segment 16. A fixed first bevel gear 58 is also provided, which meshes with the second bevel gear 56, wherein, when the first segment 14 pivots around the first axis 100, the second bevel gear 56 rolls over the stationary first bevel gear 58 and thus causes the second segment 16 to pivot around the second axis 200. The first bevel gear 58 is connected nonrotatably to the slide 28, and the axis 100 coincides with the center axis of the first bevel gear 58. The bevel gears 56 and 58 are at a right angle to each other, but some other axial offset between the two bevel gears could also be provided.

In the second segment 16, furthermore, a first belt pulley 60 is arranged, which is permanently connected to the first segment 14, wherein the center axis of the first belt pulley 60 coincides with the second axis 200. In addition, a second belt pulley 62 is rotatably supported in the second segment 16. This second belt pulley 62 is permanently connected to the third segment 18. The rotational axis of the second belt pulley 62 coincides with the third axis 300. In this configuration, when the second segment 16 is pivoted, a rotational movement of the second belt pulley 62 is initiated by means of a toothed belt 64. This rotational movement of the second belt pulley 62 brings about in turn a rotational movement of the third segment 18, connected nonrotatably to the second belt pulley 62, around the third axis 300.

The segments 14, 16, 18 of the suction arm 10 are therefore mechanically linked together in such a way that the pivoting movement of the first segment 14 brings about a pivoting movement of the second segment 16, and the pivoting movement of the second segment 16 brings about a rotational movement of the third segment 18.

FIG. 7 also shows the cam roller 54 and a transmission mechanism, which is designed to convert a vertical movement of the slide 28 into a rotational drive movement of the first segment 14 of the suction arm 10. The transmission mechanism consists of a large gear wheel 66 and a small gear wheel 68, both of which are rotatably supported on the slide 28 and which are arranged to mesh with each other. A lever 70 is mounted on the larger gear wheel 66, and the cam roller 54 is attached to one end of this lever 70. The cam roller 54, in turn, is guided in the cam guideway 50 and, when the slide 18, 30 is shifted in the vertical direction, the cam roller 54 is also moved in a transverse direction in correspondence with the course of the cam guideway 50, so that the lever 70 is also deflected in the transverse direction. As a result of the transverse deflection of the lever 70, the larger gear wheel 66 connected to the lever 70 and thus the smaller gear wheel 68 meshing with it are caused to rotate in opposite directions. The smaller gear wheel 68, for its own part, is supported in the slide 28, 30 rotatably around the axis 100 and is permanently connected to the first segment 14 of the first suction arm 10. Overall, therefore, the vertical movement of the slide 28 results in a simultaneous pivoting movement of the first segment 14, leading in turn to a pivoting movement of the second segment 16 and to a rotational movement of the third segment 18.

In the following, the sequence of the back-and-forth movements of the suction arms 10 and 12 according to the first embodiment is described in greater detail on the basis of FIGS. 1-6.

In FIG. 1, the right slide 28 is in the vertically upper end position, and the first suction arm 10 is in the pick position, in which the suction elements 20 are guided from above to a blister pack 2 and pick it up by suction. At the same time, the slide 30 is in the vertically lower end position, and the second suction arm 12 is in the place position, in which a blister pack (not shown) is placed into a compartment of the conveying means 6.

Figure 2:
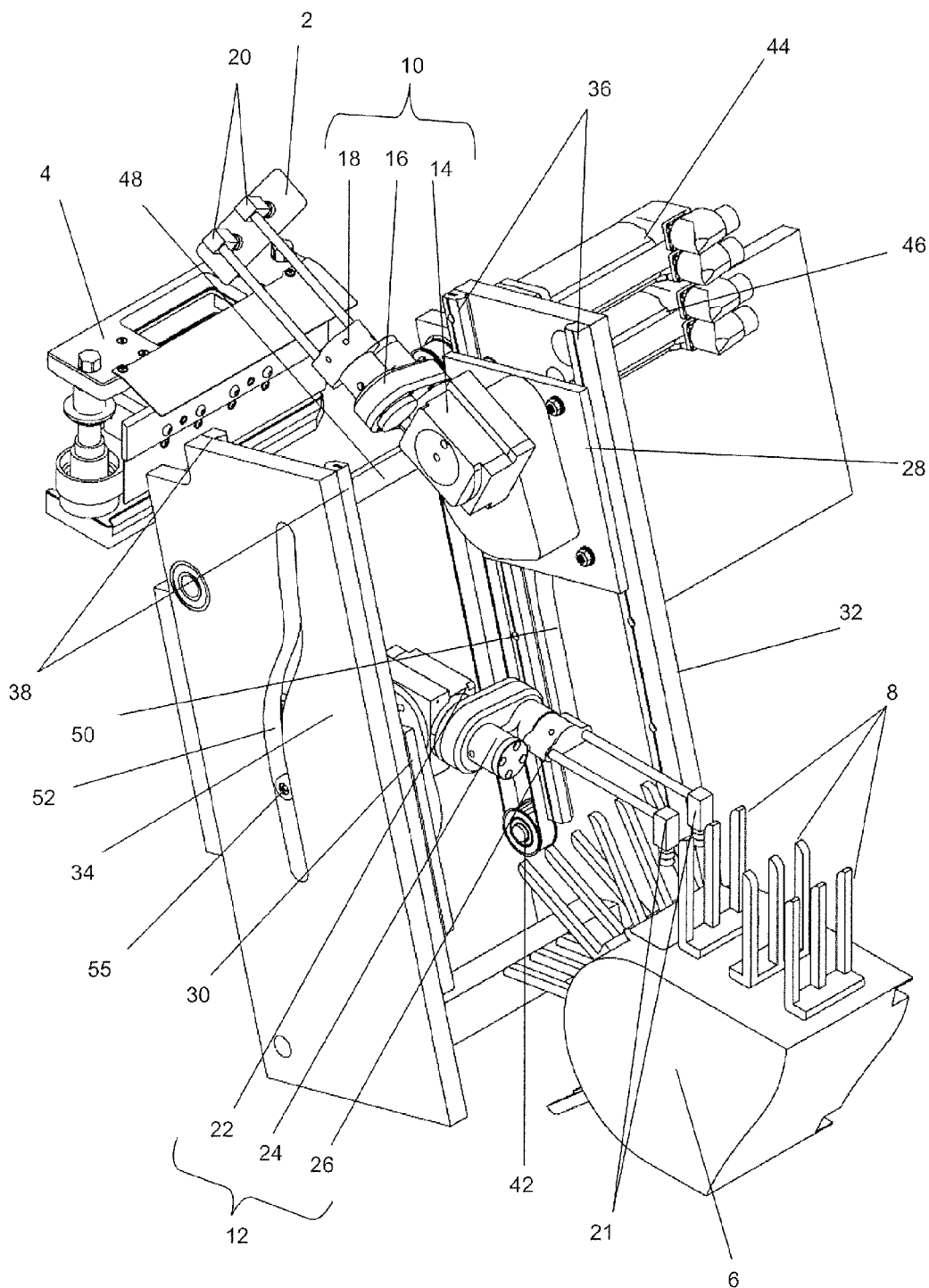

It can be seen in FIG. 2—as the sequence proceeds from the diagram in FIG. 1—that the slide 28 has been moved downward somewhat from the vertically upper position. Simultaneously, the suction arm 10 has been rotated clockwise around the first axis 100; the second segment 16, also simultaneously, has been pivoted outward around the second axis 200 out of the horizontal position. And, again simultaneously, the third segment 18 has been rotated around the third axis 300 in such a way that the blister pack 2 held by the suction elements 20 has been lifted up and rotated outward. It can be seen in FIG. 2, furthermore, that, although the left slide 30 has been moved upward, the second suction arm 12 has still not executed any pivoting or rotational movements. This is attributable to the fact that the cam roller 55 has so far traveled only along the lower, nearly vertical section of the cam guideway 52, so that as yet there has been no significant deflecting movement in the transverse direction which could initiate the pivoting movement of the suction arm 12.

Figure 3:
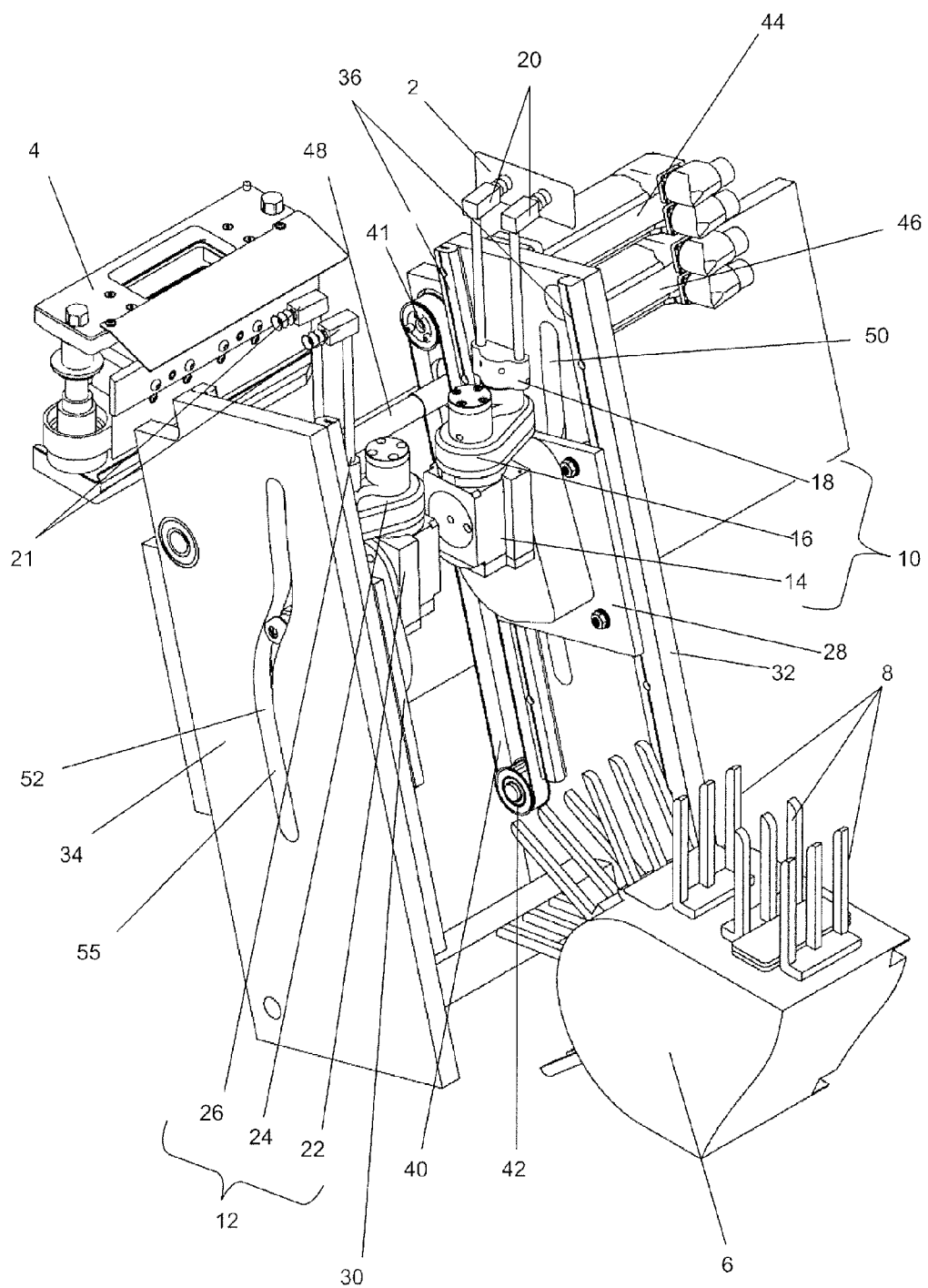

In comparison with the diagram of FIG. 2, the two slides 28, 30 in FIG. 3 have moved toward each other in opposite vertical directions to such an extent that the suction arms 10, 12 are now on the same level. In this position, the second or middle segments 16, 24 of the suction arms 10, 12 are pivoted outward from the center plane and away from each other, whereas the third segments 18, 26 are rotated in such a way that the suction elements 20, 21 are also facing outward and away from each other. The blister pack 2 being carried by the suction arm 10 is therefore oriented vertically, whereas the suction arm 12 is executing the return movement without a blister pack.

Figure 4:
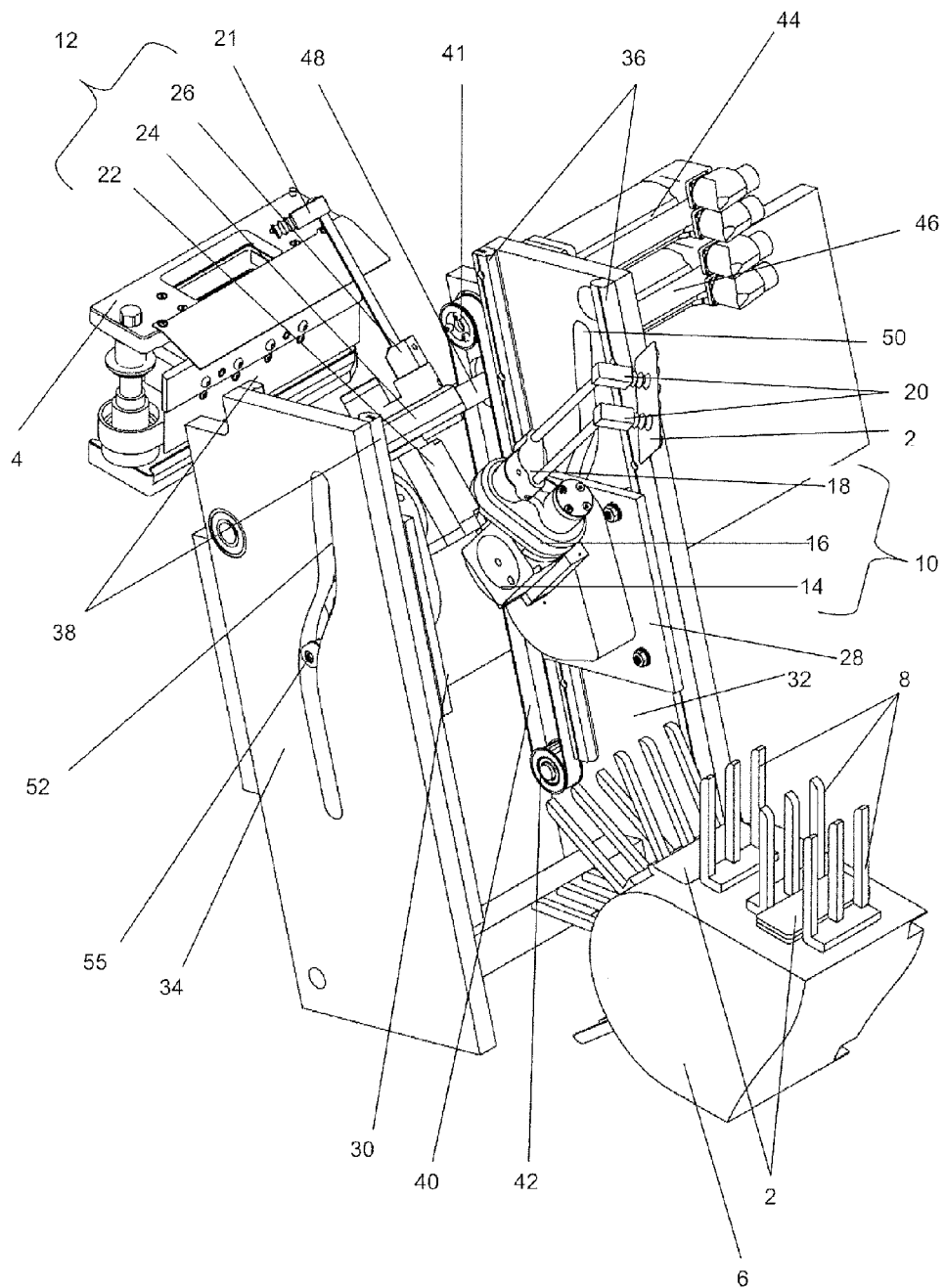

In the interval between the diagrams of FIG. 3 and FIG. 4, the two slides 28, 30 have moved passing each other without colliding. As can be derived from an overall consideration of FIGS. 1-4 together, the second segment 16 of the first suction arm 10 is first pivoted slightly counterclockwise from the position in the diagram of FIG. 1 to the position in the diagram of FIG. 2. Then the second segment 16 is pivoted farther counterclockwise, i.e., by about 180°, from the position in the diagram of FIG. 2 to the position in the diagram of FIG. 3, so that it is pointing outward, away from the second segment 24 of the second suction arm 12. From the diagram of FIG. 3 to the diagram of FIG. 4, the second segment 16 of the first suction arm 10 is pivoted even farther counterclockwise, and from the diagram of FIG. 4 to the diagram of FIG. 5, the second segment 16 of the first suction arm 10 is pivoted even farther counterclockwise, so that by this point it has executed an overall pivoting movement around the second axis 200 of approximately 360°. During the return movement of the first suction arm 10, the same pattern of movements is executed in reverse. The movements of the first suction arm 10 and of the second suction arm 12 are mirror-symmetric to the center plane.

In FIG. 5, the second segment 16 is now facing inward, and the third segment 18 has rotated concurrently in such a way that the blister pack 2 is now oriented horizontally with the pockets facing downward.

FIG. 6, finally, shows the state in which the two slides 28, 30 have been moved to the maximum vertical extent, the one downward, the other upward, wherein the first suction arm 10, versus the diagram in FIG. 5, has been moved downward only in the vertical direction, so that it can place the blister pack 2 from above into the compartment on the conveying means 6. This offers the advantage that the blister packs 2 can be set on top of each other in the compartments of the conveying means 6 to form stacks of blister packs.

Simultaneously, the second segment 24 of the second suction arm 12 has been pivoted inward around the second axis 200, and the third segment 26 of the second suction arm 12 has been rotated around the third axis 300 in such a way that the suction arm 12 is in the pick position, in which the suction elements 21 are able to pick up another blister pack.

As can be derived from FIGS. 1-6, the third segments 18, 26 of the first and second suction arms 10, 12 can be brought into the same pick and place positions.

FIGS. 8-13 show a second embodiment of a device according to the invention for transferring blister packs 2 from a stamping station 4 to a conveying means 6.

The transfer device in FIGS. 8-13 is again arranged between the stamping station 4 and the conveying means 6, wherein the stamping station 4 and the conveying means 6 are in this case located on more-or-less the same horizontal plane. This also means that the pick position and the place position are also approximately on the same horizontal plane.

As shown in FIGS. 8-12, the two suction arms 10, 12 are mounted rotatably on a frame, which comprises two parallel frame plate elements 33, 35 a certain distance apart; each of the arms has its own separate rotary drive unit 44, 46, so that it can be rotated independently of the other. In contrast to the first embodiment, the suction arms 10, 12 are not moved vertically by slides but are instead supported in the frame plate elements 33, 35 without the possibility of translational movement. Thus the first pivot axis 100 is also stationary and represents the same axis for both the first suction arm 10 and the second suction arm 12.

Figure 13:
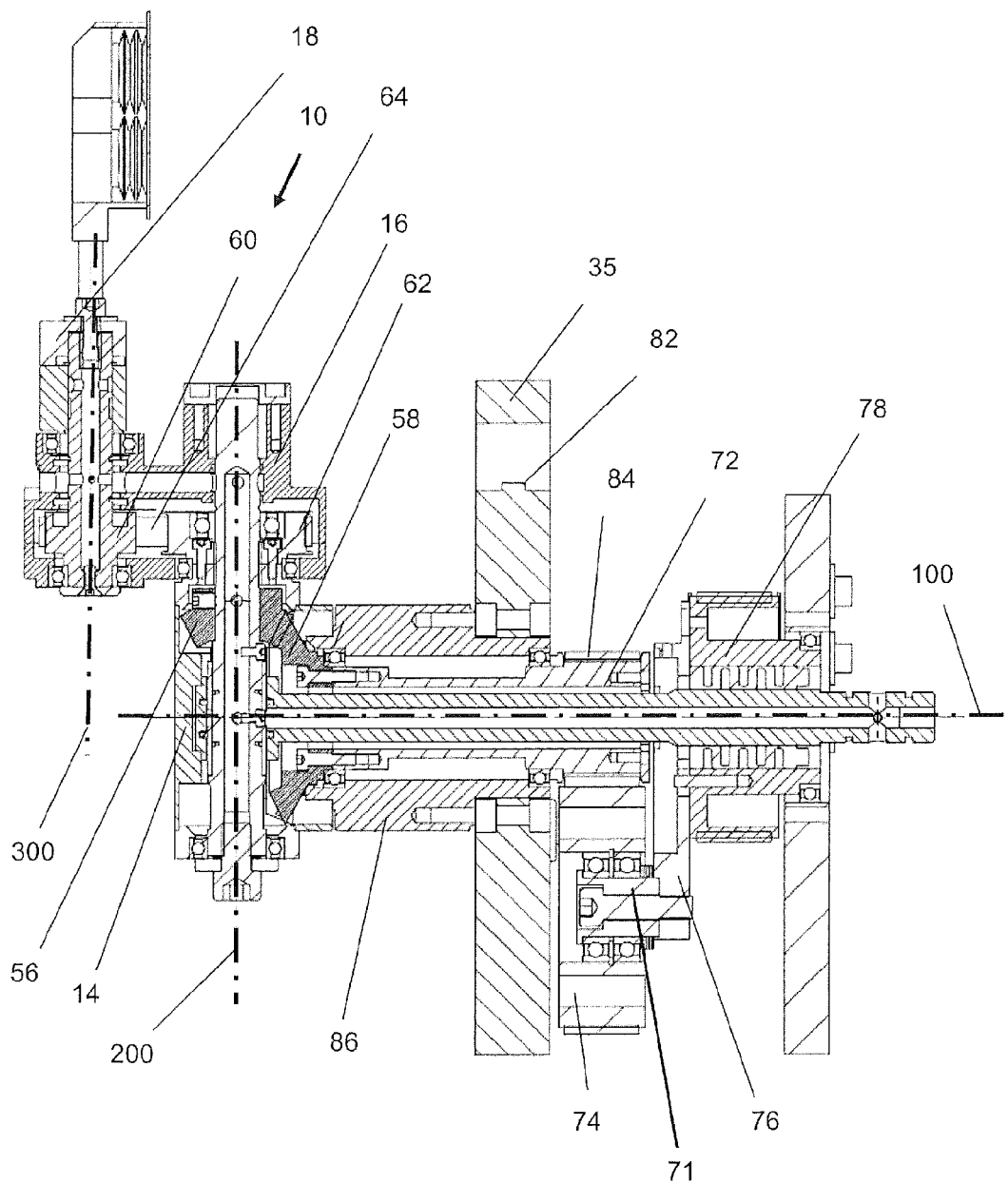
FIG. 13 shows a cross-sectional view of the first suction arm of FIGS. 8-12.

FIG. 13 shows the internal structure of the first suction arm 10 in FIGS. 8-12. The structure and function of the suction arm 10 in FIG. 13 are identical to the structure and function of the suction arm 10 already described on the basis of FIG. 7. Accordingly, the same components have been provided with the same reference numbers, so that there is no need to describe the identical parts again.

In the following, the sequence of steps of the transfer and return movements of the suction arms 10 and 12 according to the second embodiment is described in greater detail on the basis of FIGS. 8-12.

Figure 8:
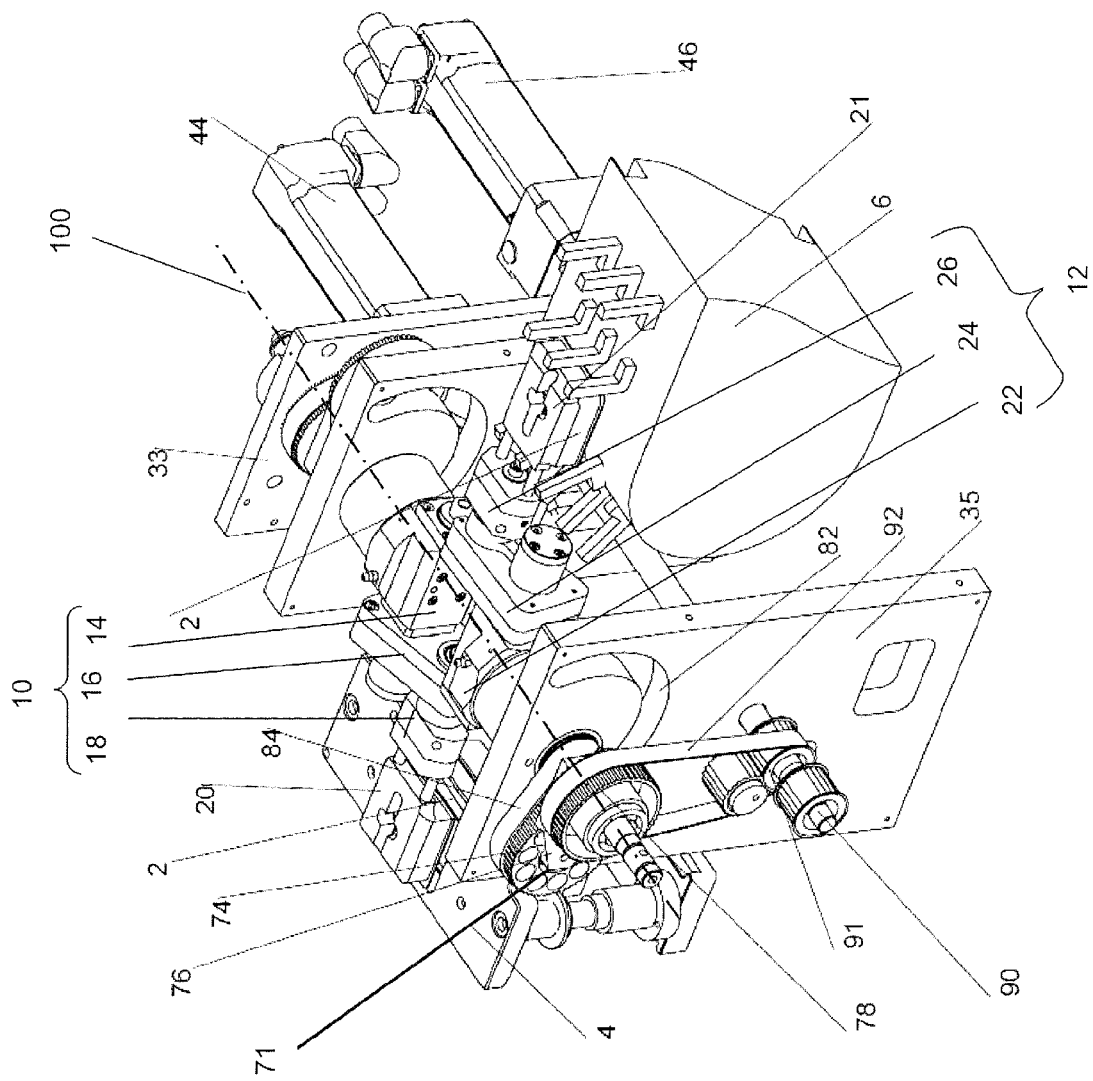
FIGS. 8-12 show perspective views of a second embodiment of the device for transferring blister packs according to the invention, in which the various phases of the transfer movement of the first suction arm and the simultaneous return movement of the second suction arm are shown.

In FIG. 8, the first suction arm 10 is in the pick position, wherein the second or middle segment 16 is pivoted inward, and the third segment 18 is rotated in such a way that the suction elements 20 can pick up a blister pack 2 at the stamping station 4 and hold it. The second suction arm 12 is in the place position, wherein the second or middle segment 24 is also pivoted inward, and the third segment 26 is rotated in such a way that the suction arm 12 can place a blister pack 2 in a compartment of the conveying means 6. To say that the second segments 16, 24 are pivoted inward means that the outer ends of the second segments 16, 24 are pointing toward the center plane, which extends between the frame plate elements 33, 35 and between the suction arms 10, 12.

Figure 9:
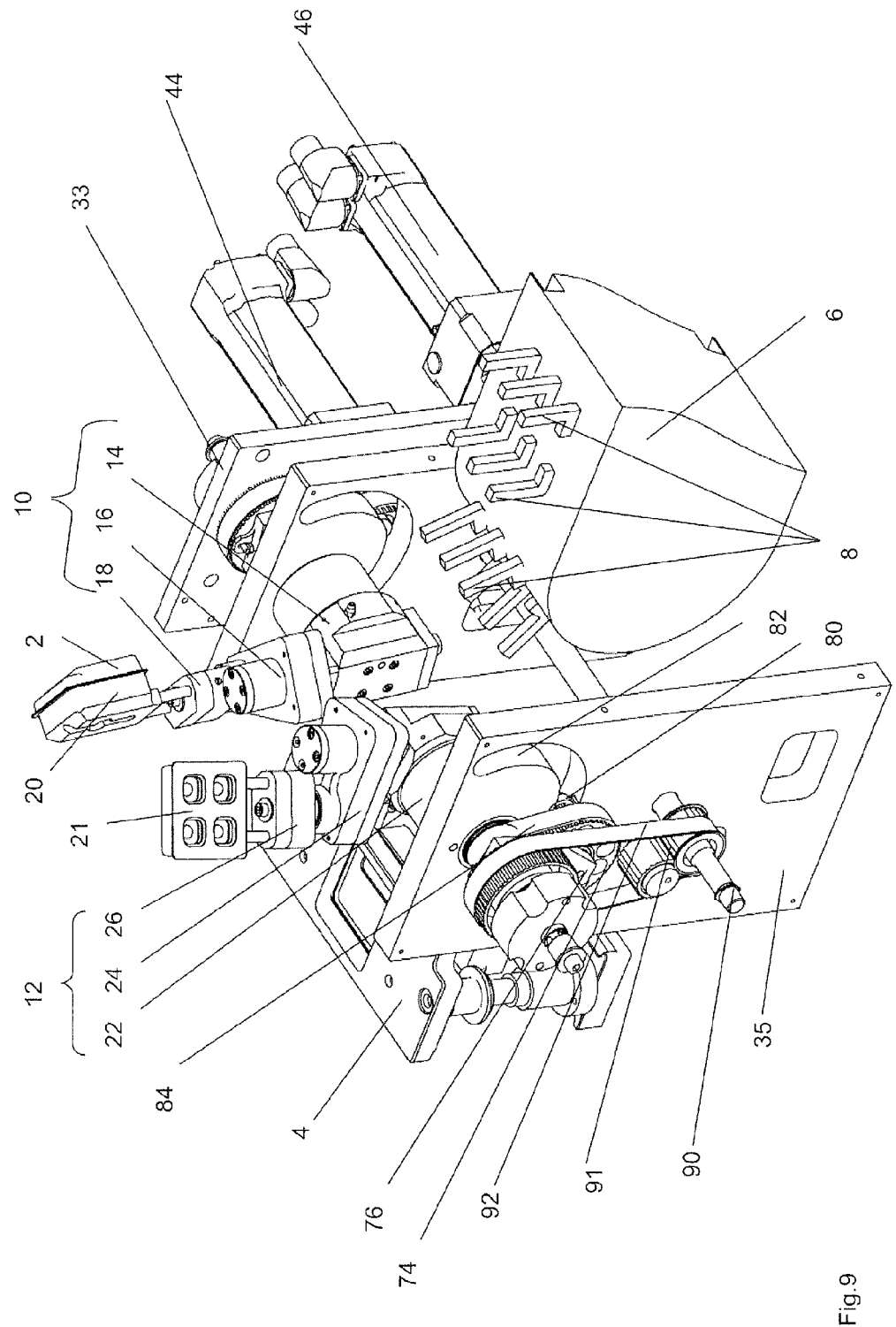

Between the diagram shown in FIG. 8 and the diagram shown in FIG. 9, the suction arms 10, 12 have been pivoted in opposite rotational directions around a common first axis 100, wherein simultaneously the second or middle segments 16, 24 have been rotated away from each other, and wherein the third segment 18 of the first suction arm 10 has already completed a rotational movement of about 90° in such a way that the blister pack 2 is rotated outward.

Figure 10:
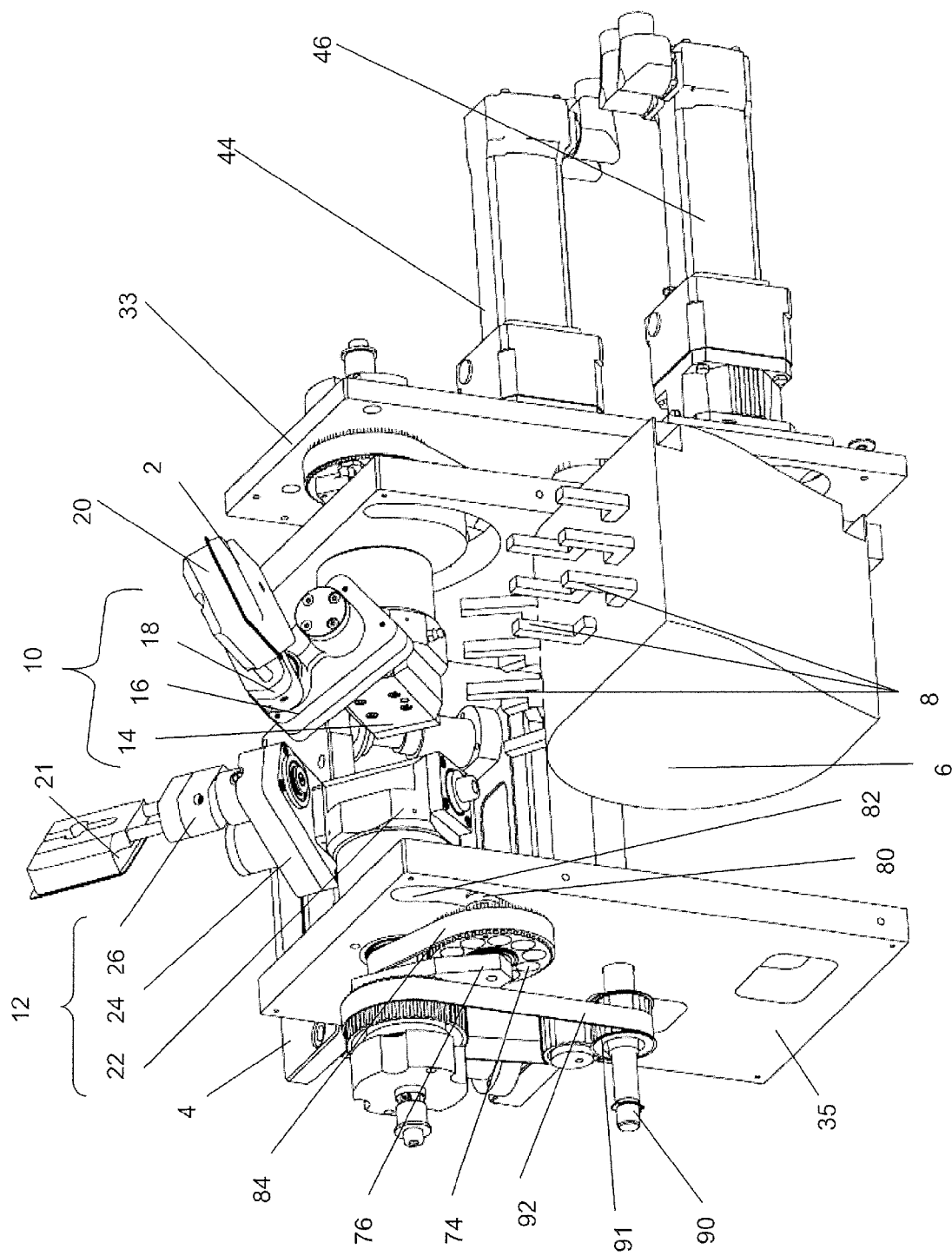

Between the diagram shown in FIG. 9 and the diagram shown in FIG. 10, the suction arms 10, 12 have been pivoted farther in opposite rotational directions and have already passed by each other without colliding. This collision-free movement is possible, because, at the time the suction arms pass by each other, the two second or middle segments 16, 24 are each in their outward-pivoted position and are thus pointing away from each other.

Figure 11:
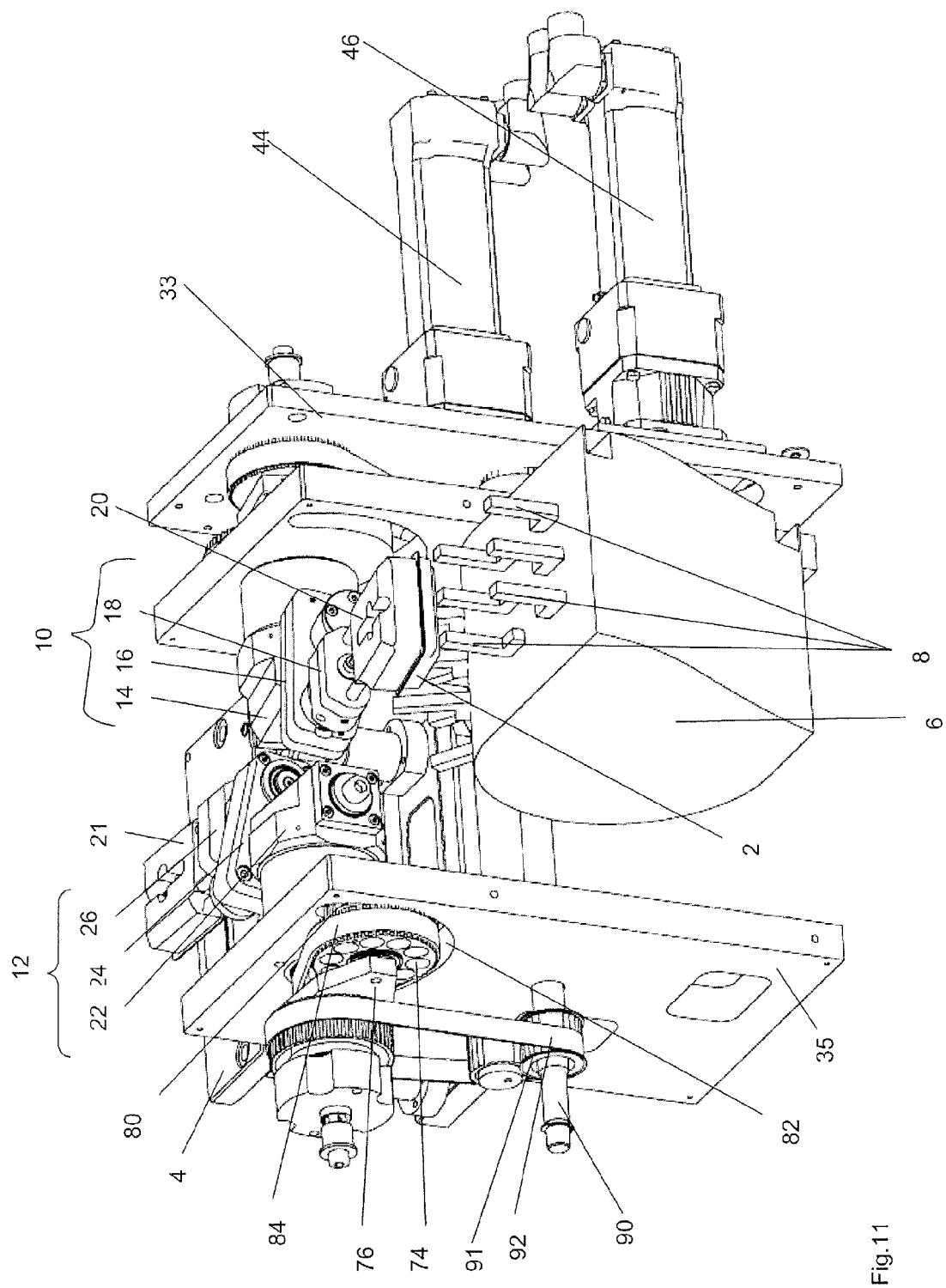
Figure 12:
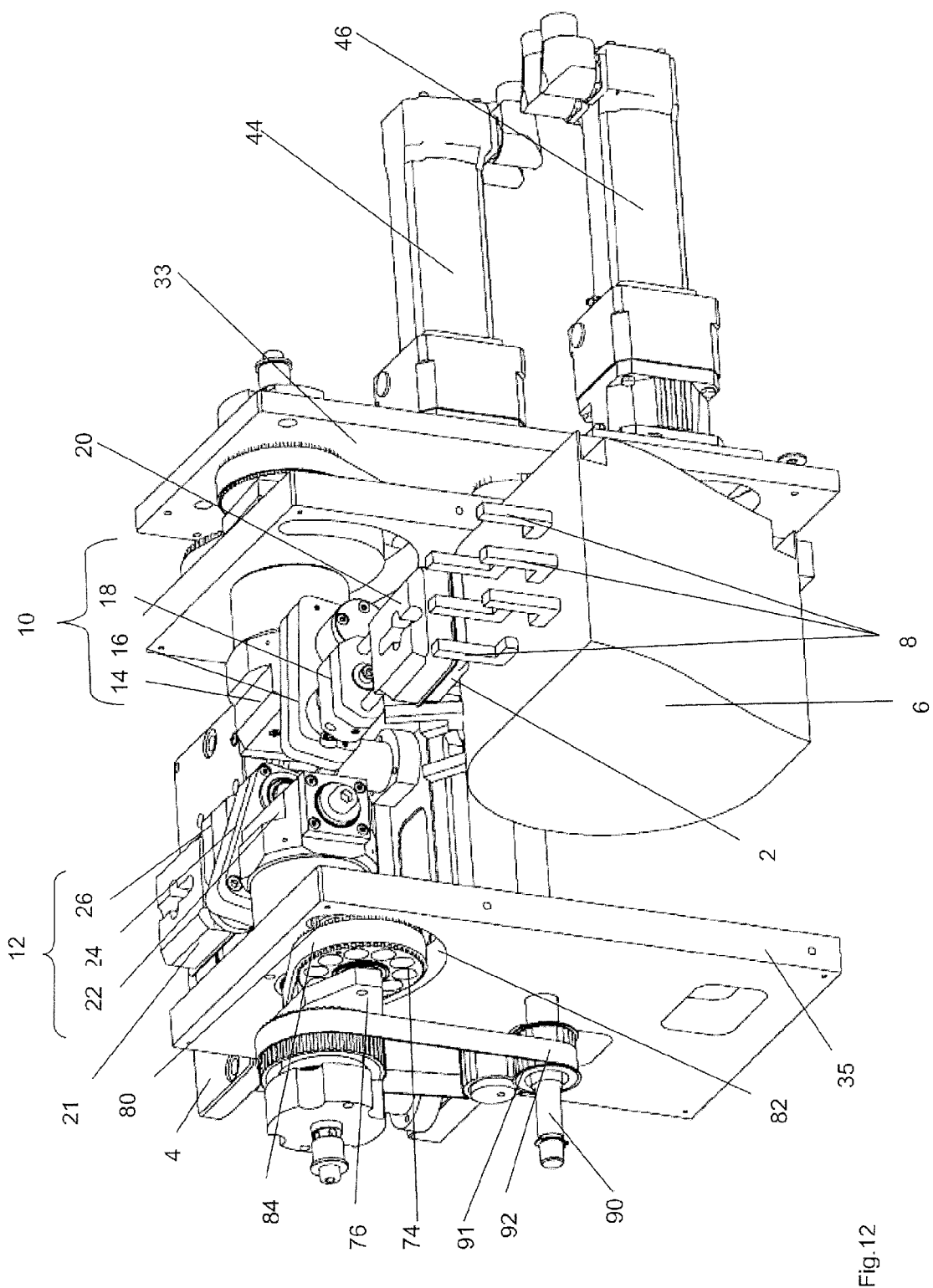

Between the diagram shown in FIG. 10 and the diagram shown in FIG. 11, the suction arms 10, 12 have been pivoted farther in their opposite rotational directions, and simultaneously the second segments 16, 24 have been moved into a horizontal position in which they are facing inward toward the center plane, whereas the third segment 18 of the first suction arm 10 has rotated in such a way that the blister pack 2 is oriented more-or-less horizontally. In FIG. 11, the suction arms 10, 12 have already completed opposite rotational movements of 180° around their first axes 100, so that the suction arm 10 is now in the place position and the suction arm 12 in the pick position.

In order to move the blister pack 2, which is oriented horizontally in FIG. 11, vertically downward from above into the compartment of the conveying means 6 and place it there, the suction arm 10 must rotate even farther, but the third segment 18, 26 may not rotate any farther, so that the horizontal orientation of the blister pack 2 can be preserved. To this end a corrective mechanism is provided, which temporarily supercedes the mechanical linkage between the first segment 14, 22 and the second segment 16, 24 by superimposing a corrective rotation.

The corrective mechanism is shown in detail in FIGS. 8 and 13. The important point here is, first, that the first bevel gear 58 is now no longer nonrotatably supported but rather rotatably supported. By rotation of the first bevel gear 58 in unison with the rotation of the suction arm 10, 12 around the first axis 100, the second bevel gear 56 can remain stationary relative to the second rotational axis 200. There is then no initiation of a pivoting movement of the second segment 16, 24 around the second pivot axis 200 or any rotational movement of the third segment 18, 26 around the third rotational axis 300. This is desirable in most cases at the two terminal areas of the pivoting movement of the suction arms 10, 12.

To make up for the absence of rotation of the second segment 16, 24 and of the third segment 18, 26, the first bevel gear 58 must, during the remainder of the movement, be moved at least partially in the direction opposite the rotational direction of the first segment 14, 22. This results in a more rapid rotational movement of the second segment 16, 24 and of the third segment 18, 26 than would be the case if the first bevel gear 58 was stationary.

There is a whole series of possibilities for this corrective mechanism. An embodiment which accomplishes the goal without an additional drive will be described in the following.

First, the first bevel gear 58 is rotatably supported in a housing 86 attached to the frame plate element 35. The corrective mechanism 71 shown here also comprises a first, smaller belt pulley 72, which is nonrotatably connected to the first bevel gear 58 and thus, like the first bevel gear 58, is free to rotate around the first axis 100. The corrective mechanism 71 also comprises a second, larger belt pulley 74, which is rotatably supported on a lever element 76. The belt pulleys 72 and 74 are connected to each other by a corrective belt 84.

The lever element 76, in turn, is fastened nonrotatably to a rotary drive belt pulley 78, which is supported rotatably around the first axis 100. A corrective cam roller 80 (FIG. 9) is mounted on the second belt pulley 74. This corrective cam roller 80 is guided in a corrective cam guideway 82, which is configured as a substantially semicircular grooved arc in a frame plate element 35. When the rotary drive belt pulley 78 is set into rotation by the drive arrangement 90, 91, 92, the second belt pulley 74 is carried along simultaneously in correspondence with the rotational angle of the rotary drive belt pulley 78. At the same time, the corrective cam roller 80 rolls along the corrective cam guideway 82 and causes the second belt pulley 74 to rotate. This corrective rotational movement is transmitted by the corrective belt pulley 84 to the first belt pulley 72 and thus also to the first bevel gear 58.

Figure 14:
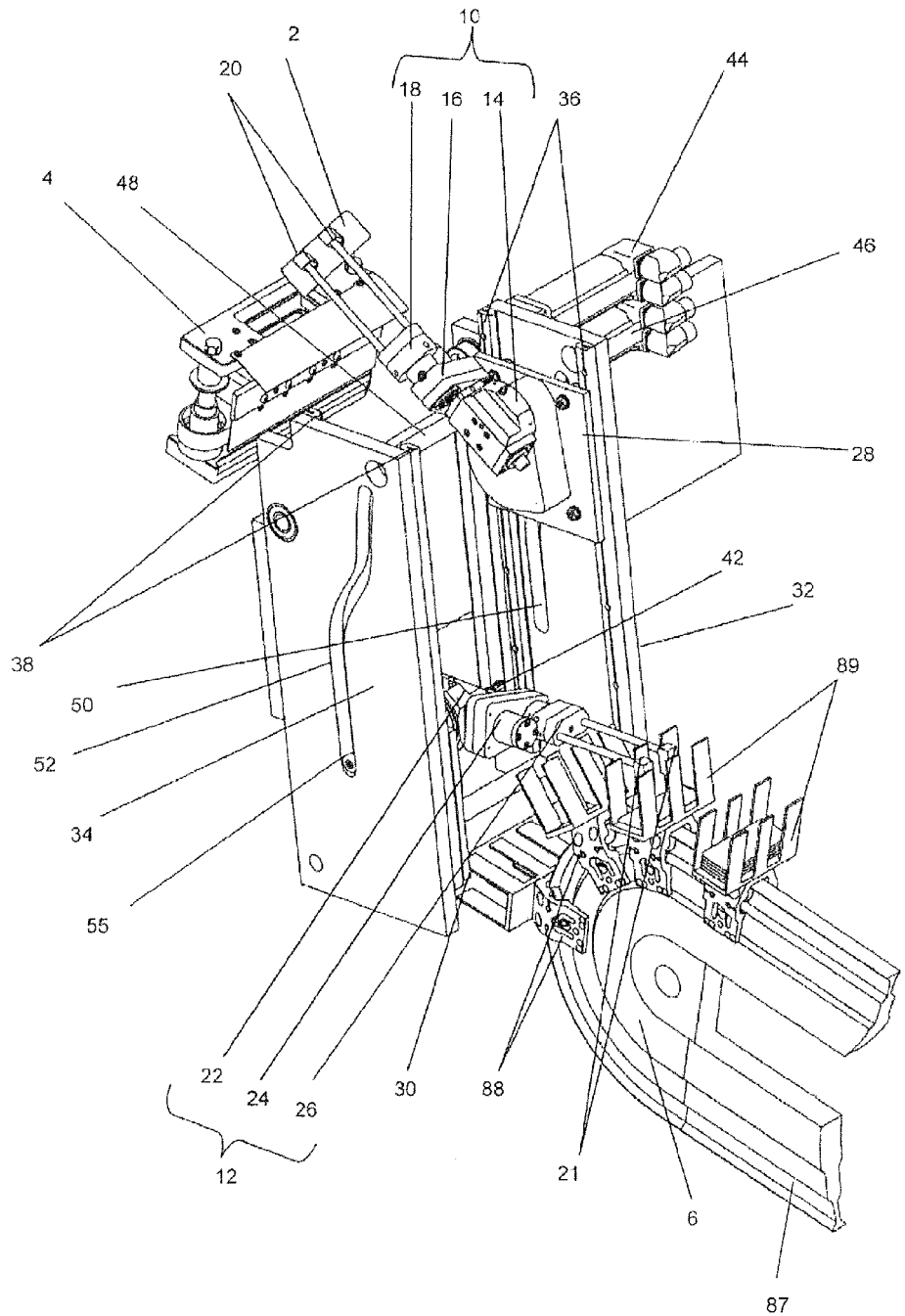
FIG. 14 shows a view similar to that of FIG. 1, wherein the conveying means is designed as a linear motor drive unit.

FIG. 14 shows an alternative configuration of the conveying means 6 in the form of a linear motor drive device. In the guide rail 87 of the conveying means 6, electrifiable coils (not shown) are arranged, which are actuated in such a way as to generate moving magnetic fields. Permanent magnets (not shown), on which the magnetic fields act, are arranged on the individual movers 88, which travel along the guide rail 87, so that each individual mover 88 can be moved independently of the other movers 88. A cartridge 89 for the material to be packaged can be arranged on each mover 88. In this way, a cartridge 89 for the material to be packaged can be brought to a rest position at certain points, one such point being the one at which stacks of blister packs are formed, whereas other cartridges 89 can simultaneously execute specific types of movement.

The invention claimed is:

1. A device for transferring blister packs from a stamping station to a conveying means, the device comprising first and second suction arms for picking up the blister packs from the stamping station in a pick position, for moving the blister packs in a conveying direction, and for placing the blister packs on the conveying means in a place position, wherein one of the first and second suction arms is arranged on one side of a center plane of the device, and the other one arm of the first and second suction arms is arranged on the other side of the center plane;

wherein the first and second suction arms are pivotable around a first axis, which is perpendicular to the conveying direction and perpendicular to the center plane, and wherein pivoting movements of the first and second suction arms are controlled in such a way that the two suction arms execute opposing back-and-forth pivoting movements;

wherein each suction arm comprises a first segment, a second or middle segment, and a third segment;

wherein the first segment of each suction arm is mounted pivotably around the first axis and comprises a section away from the first axis to which the second or middle segment is attached pivotably around a non-stationary second axis substantially perpendicular to the first axis, wherein the second segment, in turn, comprises a section a certain distance away from the second axis, to which a third segment is attached rotatably around a non-stationary third axis, which is substantially parallel to and away from the second axis; and wherein the third segment comprises a section on which at least one suction element for picking up and holding a blister pack is arranged;

wherein a transfer movement of the blister packs from the pick position to the place position and back is a combination movement, which is composed at least of the pivoting movement around the first axis, the pivoting movement around the second axis, and the rotational movement around the third axis;

wherein the blister packs are picked up from above by the at least one suction element in the pick position and placed onto the conveying means also from above in the place position; wherein the second segments are pivoted inward toward the center plane both when in the pick position and in the place position; and wherein, during the pivoting movements of the suction arms in opposite directions between the pick position and the place position, the second segments pivot away from each other so that the suction arms can pass by each other without colliding.

2. The device according to claim 1, wherein the first, second and third segments of the suction arms are mechanically linked in such a way that the pivoting movement of the first segment brings about a pivoting movement of the second segment, and the pivoting movement of the second segment brings about a rotational movement of the third segment.

3. The device according to claim 1, wherein the third segment of the first suction arm and the third segment of the second suction arm are brought into the same pick position to pick up a blister pack.

4. The device according to claim 1, wherein the second segments execute a pivoting movement of 360° around the second axis when the first and second suction arms move from the pick position to the place position or vice versa.

5. The device according to claim 1, wherein a second bevel gear, which is connected nonrotatably to the second section, is rotatably supported in the first segment, wherein, upon rotation of the first segment around the first axis, the bevel gear rolls over a first bevel gear and causes the second segment to pivot around the second axis.

6. The device according to claim 5, wherein a first belt pulley connected nonrotatably to the first segment is arranged in the second segment, and a second belt pulley is also arranged and rotatably supported in the second segment, and wherein the first belt pulley and the second belt pulley are mechanically linked by a toothed belt, wherein a pivoting movement of the second segment brings about a rotational movement of the second belt pulley.

7. The device according to claim 6, wherein the second belt pulley is connected nonrotatably to the third segment, and a rotational movement of the second belt pulley brings about a rotational movement of the third segment around the third axis.

8. The device according to claim 5, wherein the first bevel gear is rotatably supported and driven by way of a corrective mechanism.

9. The device according to claim 1, wherein the pick position and place position lie in different horizontal planes.

10. The device according to claim 9, wherein the first and second suction arms are each mounted rotatably on separate slides, which travel along independent guide devices in a vertical direction, and wherein a drive unit is provided for each slide to produce a movement in the vertical direction, wherein, between the first and second suction arms and the associated drive units, positive guidance is provided of such a type that a vertical movement of the slides brings about a pivoting movement of the first and second suction arms in opposite rotational directions around the first axis, and wherein the first axis is non-stationary because of the displacement of the slides.

11. The device according to claim 10, wherein a larger gear wheel, to which in turn a lever is attached, is rotatably supported on each slide, wherein a cam roller is arranged on the lever, the cam roller being guided in such a way that a movement of the cam roller along a cam guideway brings about a deflecting movement of the lever and thus a rotational movement of the larger gear wheel, and wherein a smaller gear wheel, which meshes with the larger gear wheel, is connected in the manner of a rotary drive to the first segment of the suction arm to bring about the pivoting movement around the first axis.

12. The device according to claim 10, wherein each drive unit comprises a rotary drive, and wherein a belt drive extending in the vertical direction and comprising a toothed belt, a drive belt pulley, and a trailing belt pulley is assigned to each slide; wherein the slides are connected to their associated toothed belts, and each rotary drive drives its associated drive belt pulley to move the slide in the vertical direction.

13. The device according to claim 12, wherein a larger gear wheel, to which in turn a lever is attached, is rotatably supported on each slide, wherein a cam roller is arranged on the lever, the cam roller being guided in such a way that a movement of the cam roller along a cam guideway brings about a deflecting movement of the lever and thus a rotational movement of the larger gear wheel, and wherein a smaller gear wheel, which meshes with the larger gear wheel, is connected in the manner of a rotary drive to the first segment of the suction arm to bring about the pivoting movement around the first axis.

14. The device according to claim 1, wherein the pick position and the place position lie in substantially the same horizontal plane.

15. The device according to claim 14, wherein a separate rotary drive is assigned to each of the first and second suction arms so that the first and second suction arms are pivoted in opposite rotational directions.

\* \* \* \* \*